(12) United States Patent
Ryan

(10) Patent No.: US 6,412,014 B1
(45) Date of Patent: Jun. 25, 2002

(54) INTERNET DIRECTORY BASED UPON NAMES RELATED TO DOMAIN NAMES

(76) Inventor: William Kenneth Ryan, 1870 Coffee Rd., Lynchburg, VA (US) 24503

( * ) Notice: Subject to any disclaimer, the term of this patent is extended or adjusted under 35 U.S.C. 154(b) by 0 days.

(21) Appl. No.: 09/337,315

(22) Filed: Jun. 22, 1999

(51) Int. Cl.⁷ ............................................. G06F 15/16
(52) U.S. Cl. ..................... 709/245; 709/213; 709/203
(58) Field of Search .................... 709/245, 213, 709/203, 217, 219, 225, 226, 229

(56) References Cited

U.S. PATENT DOCUMENTS

| | | |
|---|---|---|
| 5,410,691 A | 4/1995 | Taylor |
| 5,764,906 A | 6/1998 | Edelstein |
| 5,832,498 A * | 11/1998 | Exertier .......................... 707/1 |
| 6,167,449 A * | 12/2000 | Arnold et al. ........... 707/104.1 |

OTHER PUBLICATIONS

Internet One found at http://www.io.io/rules.html.

\* cited by examiner

*Primary Examiner*—Mehmet B. Geckil
(74) *Attorney, Agent, or Firm*—Donavon Lee Favre

(57) ABSTRACT

A directory is associated with each of a plurality of top level domain names on the Internet, so that any competitor, related goods and service provider or any other legitimate name owner be they family, trademark holder or registered company can list in an associated directory under any of a plurality of top level domain names.

10 Claims, 1 Drawing Sheet

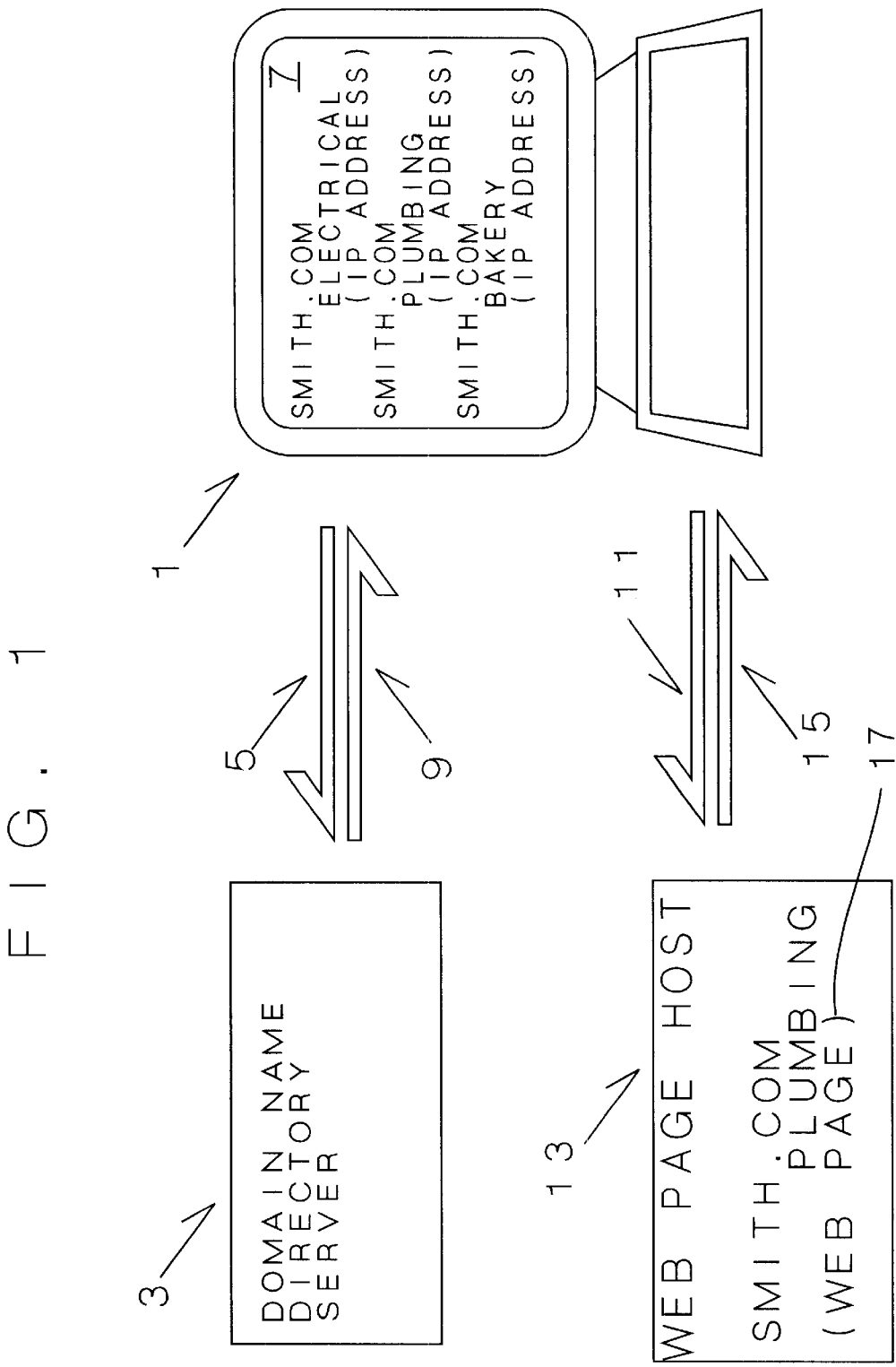

INTERNET DIRECTORY BASED UPON NAMES RELATED TO DOMAIN NAMES

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The Internet can link your computer to any other computer connected to the Internet. The reason the Internet works is that every computer connected to it uses the same set of rules and procedures (known as protocols) to control timing and data format. The set of commands and timing specifications used by the Internet is called Transmission Control Protocol/Internet Protocol, universally abbreviated as TCP/IP.

The TCP/IP protocols include the specifications that identify individual computers and exchange data between computers.

Most computers are not connected directly to the Internet. They are connected to smaller networks that connect through gateways to the Internet backbone. The core of the Internet is the set of backbone connections that ties the local networks together and the routing scheme that controls the way each piece of data finds its destination.

Internet activity can be defined as computers communicating with other computers using TCP/IP. The computer that originates a transaction must identify its intended destination with a unique address. Every computer on the Internet has a four-part numeric address, called the Internet Protocol address or IP address, which contains routing information that identifies its location. Each of the four parts in a number between 0 and 255, so an IP address looks like this:

128.296.516.214

Computers have no trouble working with big strings of numbers like this, but humans are not so skilled. Therefore, most computers on the Internet (except the ones used exclusively for internal routing and switching) also have an address which is part of a Domain Name System (DNS), an address that uses words instead of numbers.

DNS addresses generally have an individual name, followed by a top level domain name for a computer connected to the Internet that generally identifies the type of institution that uses the address, such as .com for commercial businesses or .edu for schools, colleges and universities. The University of Washington's DNS address is washington.edu, Microsoft's is microsoft.com.

Within the United States, the last letters of the domain name usually tell what type of institution owns the computer. Some large institutions and big corporations divide their domain addresses into small subdomains. You might even see some subdomains broken into even smaller sub-subdomains.

Top level domains can also identify the country in which the system is located, such as .ca for Canada or .fr for France or va.us can indicate an Internet domain in Virginia. Sometimes, a geographic domain address will also include a subdomain that identifies the district within the larger domain. For example, there is a commercial Internet service provider in the Canadian province of British Columbia called Mindlink. Its DNS address is *Mindlink.bc.ca*.

The basic model for Internet tools is used for many function: a client application on a user's computer requests information through the network from a domain name server, a powerful computer, containing a large memory, which acts as a shared storage resource. For example a user sends a domain name to the server, and the server returns the IP address, the four part numeric address which is then used to contact the computer having that particular IP address.

The above general information concerning the Internet was taken in part from COMPUTING FUNDAMENTALS, Second Edition, pages 295 to 297 by Peter Norton, published by Glencoe McGraw-Hill (1987).

One problem with the Internet is that each domain name (individual name plus top level domain) is unique, and duplicates are not allowed. Various companies have the same name but deal in different types of goods, but only the first company that registers on a top level domain is allowed to use that name, giving that particular company a monopoly on a name. The same is true with Trademarked goods. The same Trademark is used by different companies on different types of goods, but only the first company to register the name on a domain is allowed to use the Trademark as a domain name. This makes finding a company by its name or the name of the product that it produces or the service that it provides difficult using domain names.

One solution to the problem involves setting up an independent registry for "nicknames" as disclosed in the following patent.

U.S. Pat. No. 5,764,906 Edelstein et al (1998) at the abstract discloses the following. "A universal electronic delivery system allows a user to locate information on a distributed computer system or network such as the Internet by knowing or guessing a short mnemonic alias of an electronic resource without the user having to know the physical or other location denotation such as the universal resource locator (URL) of the desired resource. The system hardware includes a client computer, a local server, a central registry server, a value added server, and a root server. The universal electronic resource denotation, request and delivery system supports a personal aliasing (nicknaming) feature, a universal resource accessing feature for finding location information such as URL's relating to a query term, a "see also" feature for including information about related documents or resources within the record of a resource, a feature for updating local servers and client machines by periodically deleting those records which have changed, a "try again" and "mirroring" feature for aiding a user in obtaining the resource under adverse hardware or software conditions, and an authentication and administration feature that allows a user to administer the aliases and related data which pertain to his/her resources." At col. 13, lines 24-63, Edelstein discloses "FIG. 6 depicts the organization of the dual implementation of the preferred embodiment of this invention. In this implementation, the client system 603 provides the user with the choice of whether to prefer the Local or the Wide Area or Global (Internet) interpretations of Resource Aliases. This Reference guides the local server 604 to search for a Resource alias or character string purported to be a Resource Alias first in its Local Registry 606 or first in the Global System 605. If the preferred choice fails to match a Resource Alias, the secondary system (for that particular user) search is activated. Thus, each client request is accompanied by system preference data. The Client User interface in displaying lists of Resource Aliases or individual Resource Aliases and their associated Records, also displays whether that particular Resource Alias and Record are Local or Global (Wide Area or Internet). The local Server 604 is advantageously linked with the Central Registry or Root Server and Value Added Services, 607 of the Wide Area System.

A fictional example of such usage is one wherein the U.S. Department of Agriculture registers a global Internet Source Alias "DOA" and an associated Resource Alias "DOA/Pathology" which provides information about animal or plant pathology resources, and wherein a hospital complex maintains an Internet Domain which also serves as a Central Registry for local community Resource Aliases and registers a Source Alias "DOA" for information on "dead on arrival" and a Resource Alias "DOA/Pathology" for information about its pathology information database for DOD. A user of this community would elicit the local Resource Alias Record in response to a request for "DOD/Pathology" but could override this response by requesting global Resource Aliases. The local server would, in this case, request the Resource Alias Record from the Internet Central Registry on behalf of the Client and the User. Alternatively, the system could search the global, the local and the nickname caches for a sequence match and return all Resource Alias records corresponding to any match. The matching records would then be displayed for user selection or further action"

INTERNET ONE of the British Indian Ocean Territory has a practice which is even more monopolistic against residents of the territory than the other national Internet organizations. Residents are forced to register as "name".com.io. Other registrants are allowed to register domain names on a first come, first registered basis, with a directory set up for duplicate names which are not the first registered domain names.

U.S. Pat. No. 5,410,691 Taylor (1995) may be of interest in its organization of a network database. The Patent discloses at the abstract, "The network database is arranged in a plurality of domains in a logical hierarchy. Each domain of the hierarchy represents a body of information associated with a logically related group of users or related group of computers. A relative naming scheme is implemented in which a domain stores the names of only its parent domain and child domains. This permits reconfiguration of the network to be accomplished without changing the database structure. Each domain stores information in a hierarchical structure known as a "directory" Each directory consists of a list of zero or more "properties," each having an associated name and ordered list of values."

BRIEF SUMMARY OF THE INVENTION

The present invention is directed to an improvement in national or other top level Internet registry system for example .com, .net, org, .edu, .gov, .mil etc which allows nationals to register a primary domain name resulting in a plurality of registered domain names. The improvement comprises a directory associated with each of a plurality of primary domain names in the DNS, the associated directory containing a collection of names and information concerning owners of names identical, similar to or related to the primary domain name. The numeric IP address is preferably a numeric IP address of a directory separate from the numeric IP address of the primary domain name. The information in the numeric IP address of each directory includes the unique numeric Internet address if available of each of one or more owners and information concerning each of the owners of identical and similar names listed in each directory. By the owner of a name is meant an entity having a legal right to use a particular name such as a family name, a business name, a trademark, a service mark or any legalized right to use a particular name. The Internet should not be recognized as a system for preempting a family name or the right of an entity to capitalize on a name that the owner entity has established as an indication of quality goods or quality services and relinquish the right either to the first to register or to an opportunist who recognizes the value of a name and registers it to extort money from those who put value into the name.

The associated directory can if desired have one or more sub directories broken down in any known manner containing the names and IP addresses of the owners of similar names and information concerning the owners of similar names, or such names can be contained in the associated directory.

The associated directory can if desired contain a sub directory for a listing of the names and IP addresses of entities supplying goods or services relating to or supportive of one of the entities in the national or top level domain.

The IP address is not required in any event for a listing in the associated directory as a company may only list a phone number or an e-mail number, but the majority of legitimate businesses have or in the future will have an IP address. A requirement should be made that any entity doing business on the Internet should have a traceable geographic address.

The present move by the Internet system to add more top level domains such as .store and .web will not, in many cases, increase the opportunity for entities to register, because those already registered will ensure duplicate registrations by registering first or squatters will register first with the hope of extracting substantial amounts of money from those entities who by creating valuable goods or services, put value in a name.

The present invention solves the monopolistic problem of allowing only unique registration of a specific domain name to each top level domain or a nickname on a single registry to a single company or restricting nationals from registering a primary domain name. The problem is solved by associating a directory with each domain name so that any company providing related goods are services can advertise in the directory regardless of their domain name or numerical Internet address. The directory does not have to contain any information, merely be available in case any entity wishes a listing. In addition, any individual, organization or institution can obtain a listing in a domain name directory of their choice. It is not necessary that the entity obtaining the listing even have a numerical Internet address. A postal address, a phone number or any other information that the entity wishes to provide will be accepted including political, and religious advertising with no source indication.

BRIEF DESCRIPTION OF THE VIEW OF THE DRAWING

FIG. 1 shows the route taken to obtain related domain names, and/or addresses and/or phone numbers.

DETAILED DESCRIPTION OF THE INVENTION

How to find a name related to a domain name will be described with reference to FIG. 1. A users computer 1 is connected to the Internet. The computer 1 accesses domain name directory server 3 through a communication line 5. When a known or anticipated domain name is requested from the domain name server 3, the domain name server returns a unique address if only one domain name is registered, or a directory page 7 if several domain names with separate numeric IP addresses are registered under the same domain name. For example if the user knew the domain name was "Smith", the user could enter "Smith.com". The domain name server 3 then supplies a listing of the names and associated information which constitute the directory 7 and the corresponding four part numeric address (IP address) corresponding to each name for the directory 7 by return communication line 9. The listing 7 would contain a number of "Smith.com" listings along with sufficient information concerning each listing, that user could chose which "Smith.com" user was searching for. The directory listing 7 would contain for each entity entry, for example, the type of activity the entity was engaged in, the geographical location of the entity, the IP address and/or any other information that the entity wanted to include to distinguish that particular entity from the other listings.

The directory page 7 returned to the user at computer 1 is preferably an Internet web page, and each directory entry is a hyperlink to the corresponding numeric IP address of the respective directory entry. By selecting the desired "smith.com" from the directory list (for example by "clicking" on the hyperlink), the user by computer 1 uses the IP address and sends a request through communication line 11 to the Web page host 13 containing the IP address listed for that particular Smith listed in listing 7, and by return line 15 receives the information contained in that particular Smiths' web page 17.

As an alternative the directory can be separated from the domain name. This requires two separate numeric IP addresses for each primary domain name. One numeric IP address for the primary domain name registered under the current registration system and a second numeric IP address for the directory 7 containing names related to the primary domain name.

If the domain name directory is separate from the primary domain name, a request is placed for a domain name directory 7 corresponding to a known domain name. A directory 7 is associated with each non-unique alphabetical domain name. The directory 7 can be accessed using a domain name without the .xxx or followed by a "/dir" or a ".dir", such as "{domain name}/dir" or "{domain name}.dir" or a similar known access means. Preferably the directory 7 is accessed using an Internet numeric IP disassociated with the domain name numeric IP. The present invention contemplates the creation of one or more top level domains that do not follow the current pattern, and are used for e.g. directory functions such as described above or for family name directories.

The listings in the associated directory can be broken down into separate listings for entities having an IP address.

The listings in the associated directory can be ranked in order of the frequency of selection, or by post office address, e-mail address or telephone area code. In the case of post office address, e-mail address, or telephone area code, no IP address is required.

Another advantage of the present system is that competitors of the owner of the primary domain name can advertise in an associated directory under the primary domain name, reducing to some extent the monopoly rights in the primary domain name.

Directory 7 contains a separate listing associated with each of a plurality of national domain names, so that any company providing related goods or services can advertise in the directory 7 regardless of their domain name or numerical Internet address at the discretion of the national or international registration organization. In addition, any individual, organization or institution can obtain a listing in an associated domain name directory 7 of their choice. It is not necessary that the entity obtaining the listing even have a numerical Internet address. A postal address, a phone number or any other information that the entity wishes to provide will be accepted including political, and religious advertising with no source indication, again at the discretion of the national or international registration organization.

The term "national domain name" excludes the registry of names of nationals in a registry such as the Indian Ocean registry where nationals are required to register in a collective registry.

Not all primary domain names will have an associated directory 7 containing listings of other domain names. Some primary domain name owners will be reluctant to allow such a practice, and some non primary domain name owners will be reluctant to list a non primary domain name in a directory under a primary domain name.

By a "primary domain name" is meant a domain name registered by a national authority under the present registration system. By a "secondary domain name" is meant a domain name registered in a directory of the present invention.

What is claimed is:

1. In a national or other top level Internet registry system which allows nationals to register a primary domain name resulting in a plurality of registered domain names, all different, the registry system having a large number of computers connected to a central registry computer system containing the plurality of primary domain names, the improvement comprising an associated directory under each of a plurality of the different primary domain names, a collection of one or more secondary domain names and information concerning the owner or owners of each of the secondary domain names contained in each associated directory.

2. The Internet system of claim 1 wherein each of a plurality of associated directories includes the secondary domain name or names of the owner or owners of the secondary domain names and the IP address of each of the secondary domain name owners in the information provided.

3. The Internet system of claim 1 wherein each of a plurality of associated directories contains one or more secondary domain names identical to the primary domain name.

4. The Internet system of claim 1 wherein the improvement further comprises a separate listing of entities with an IP address.

5. The Internet system of claim 1 wherein the improvement further comprises the secondary domain names ranked in the order of frequency of selection.

6. The Internet system of claim 1 wherein the improvement further comprises the secondary names listed by post office address.

7. The Internet system of claim 1 wherein the improvement further comprises the secondary names listed by telephone area code.

8. In a national or other top level Internet registry system which allows nationals to register a primary domain name resulting in a plurality of registered domain names, all different, the registry system having a large number of computers connected to a central registry computer system containing the plurality of primary domain names, the improvement comprising an associated directory under each of a plurality of the different primary domain names, a collection of one or more secondary names in each of a plurality of associated directories, and information concerning the owner or owners of each of the secondary names contained in each associated directory.

9. The Internet system of claim 8 wherein each associated directory contains the name, address, phone number, and e-mail address of each of a plurality of the owners of each of the secondary names.

10. In a national or other top level Internet registry system which allows nationals to register a primary domain name resulting in a plurality of registered domain names, all different, the registry system having a large number of computers connected to a central registry computer system containing the plurality of primary domain names, the improvement comprising an associated directory under a plurality of each of a plurality of the different primary domain names, and a collection of names and information concerning entities competitive with the owner of the primary domain name, contained in each associated directory.

* * * * *